US005473653A

United States Patent [19]

Harding

[11] Patent Number: 5,473,653

[45] Date of Patent: Dec. 5, 1995

[54] METHOD OF GENERATING SLICE IMAGES, AND DEVICE FOR CARRYING OUT THE METHOD

[75] Inventor: Geoffrey Harding, Hamburg, Germany

[73] Assignee: U.S. Philips Corporation, New York, N.Y.

[21] Appl. No.: 195,412

[22] Filed: Feb. 14, 1994

[30] Foreign Application Priority Data

Feb. 13, 1993 [DE] Germany .......................... 43 04 332.1

[51] Int. Cl.[6] .......................................... G01N 23/00

[52] U.S. Cl. .......................................... 378/2; 378/23

[58] Field of Search .......................................... 378/2, 23

[56] References Cited

U.S. PATENT DOCUMENTS 3,499,146 3/1970 Richards ................................ 250/61.5
5,022,066 6/1991 Haaber et al. .............................. 378/2

OTHER PUBLICATIONS

"Optimum Spread Functions In Linear Tomography" G. Harding, Phys. Med. Biol. 1975, vol. 20, No. 1, pp. 144–149.

"A Method For Improving The Transfer Function Of Linear Tomographic Systems" Phys. Med. Biol. 1977, vol. 22, No. 4, pp. 747–759.

*Primary Examiner*—Craig E. Church
*Attorney, Agent, or Firm*—Jack D. Slobod

[57] ABSTRACT

The invention relates to a method of generating slice images of an examination zone which is irradiated by X-rays from a plurality of radiation source positions in order to generate separate single images, each associated with a difficult one of the source position for each single image there being stored image values which correspond to the absorption in its image points, slice images being generated in that slice image values are derived from the image values of the image points of the single images which are geometrically associated with a slice image point. This may give rise to contrast reversal and pseudo-resolution effects. These effects are eliminated in that the slice image values are derived by a weighted summing operation where the weighting factor applied to the image values of the single images enter the summing operation decreases as the distance between the radiation source position associated with the single image a central radiation source position increases.

3 Claims, 3 Drawing Sheets

METHOD OF GENERATING SLICE IMAGES, AND DEVICE FOR CARRYING OUT THE METHOD

BACKGROUND OF THE INVENTION

1. Field of the Invention

The invention relates to a method of generating slice images of an examination zone which is irradiated by X-rays from a plurality of radiation source positions in order to generate separate single projection images, for each single image there being stored image values which correspond to the absorption in its image points, slice images being generated in that slice image values are derived from the image values of the image points of the single images which are geometrically associated with a slice image point.

An image point is to be understood to mean hereinafter a finite, preferably square zone of a single image, whereas a slice image point is to be understood to mean a corresponding zone in the slice image.

2. Description of the Related Art

A method and a device of this kind are known, for example from U.S. Pat. No. 3,499,146. The single images are generated therein by means of an X-ray source which is successively moved to different radiation source positions. The radiation relief is picked up by an image converter, for example an image intensifier whose exit luminescent screen image is scanned by means of a television camera. The video signal thus generated is digitized. The digital data words produced correspond to the image values of the single image. They are stored in a preferably digital storage device. The slice image values for the various slice image points are derived from the image values of image points geometrically associated with the relevant slice image point, i.e. of those image points which are situated on the connecting line between the relevant slice image point and the various radiation source positions during the generating of the layer image.

It has been found that areas which are situated within the examination zones but outside the layer whose details are to be sharply reproduced can incur contrast reversal or pseudo-resolution in the layer image when the radiation source positions are situated on a straight line or on a circular arc about a horizontal axis.

It is known that such effects can also occur in conventional systems for linear tomography in which a layer image is formed by continuous shifting between a film and an X-ray source. It is known (see Harding et at. in Phys. Med. Biol., 1975, Vol. 20, No. 1, pp. 144–149) that these effects can be eliminated by making the X-ray tube current increase and decrease according to a triangle-shaped function during the exposure. According to an improved version of this method (Phys. Med. Biol., 1977, Vol. 22, No. 4, pp. 747–759), instead of the delta modulation a bell-shaped modulation curve is used, thus achieving a better compromise between suppression of undesirable effects and deterioration of blurring of details outside the layer.

Both methods necessitate an intervention in the X-ray generator feeding the X-ray source and require sufficiently fast control of the current during a layer exposure.

SUMMARY OF THE INVENTION

It is an object of the present invention to conceive a method of the kind set forth so that contrast reversal or pseudo-resolution during layer exposures can be at least partly eliminated without intervention in the X-ray generator, as well as to provide a device for carrying out the method.

This object is achieved in accordance with the invention in that the slice image values are derived by a weighted summing operation where the weight with which the image values of the single images enter the summing operation is smaller as the distance between the radiation source position and a mean radiation source position was greater upon generation of the relevant single image. A device for carrying out the method is characterized in that the image processing unit comprises an arithmetic unit which, in order to generate slice images, multiplies the image values by a weighting factor which is dependent on the radiation source position upon generation of the associated single image and which sums the image values, thus weighted, of the image points geometrically associated with a slice image point.

Said undesirable effects are eliminated in accordance with the invention in that the single images wherefrom a slice image (of arbitrary position) is reconstructed enter the reconstruction with a different weight. No intervention in the X-ray generator is then required.

Like in the previously mentioned method, the reduction of the contrast reversal or pseudo-resolution effects causes objects or details which are situated in the examination zone but outside the layer which is sharply imaged by the layer exposure, are reproduced in a less blurred manner in the layer image, so that the diagnosis could be effected. On the other hand, the contrast reversal and pseudo-resolution effects can occur more or less strongly in different images. The weighting of the single images upon the generation of a layer image, however, also leads to a reduction of blurting in these cases where elimination of said effects was not even necessary.

Therefore, in a preferred embodiment of the invention the image processing unit comprises a memory in which several, different sets of weighting factors are stored, there being provided selection means for the preferably interactive selection of a set of weighting factors. The user can then always select the set of weighting factors offering the most favourable compromise between the reduction of the undesirable effects on the one hand and the blurring of details outside the layer plane on the other hand.

BRIEF DESCRIPTION OF THE DRAWING

The invention will be described in detail hereinafter with reference to the drawing. Therein.

DETAILED DESCRIPTION OF THE PREFERRED EMBODIMENTS

Figure 1:
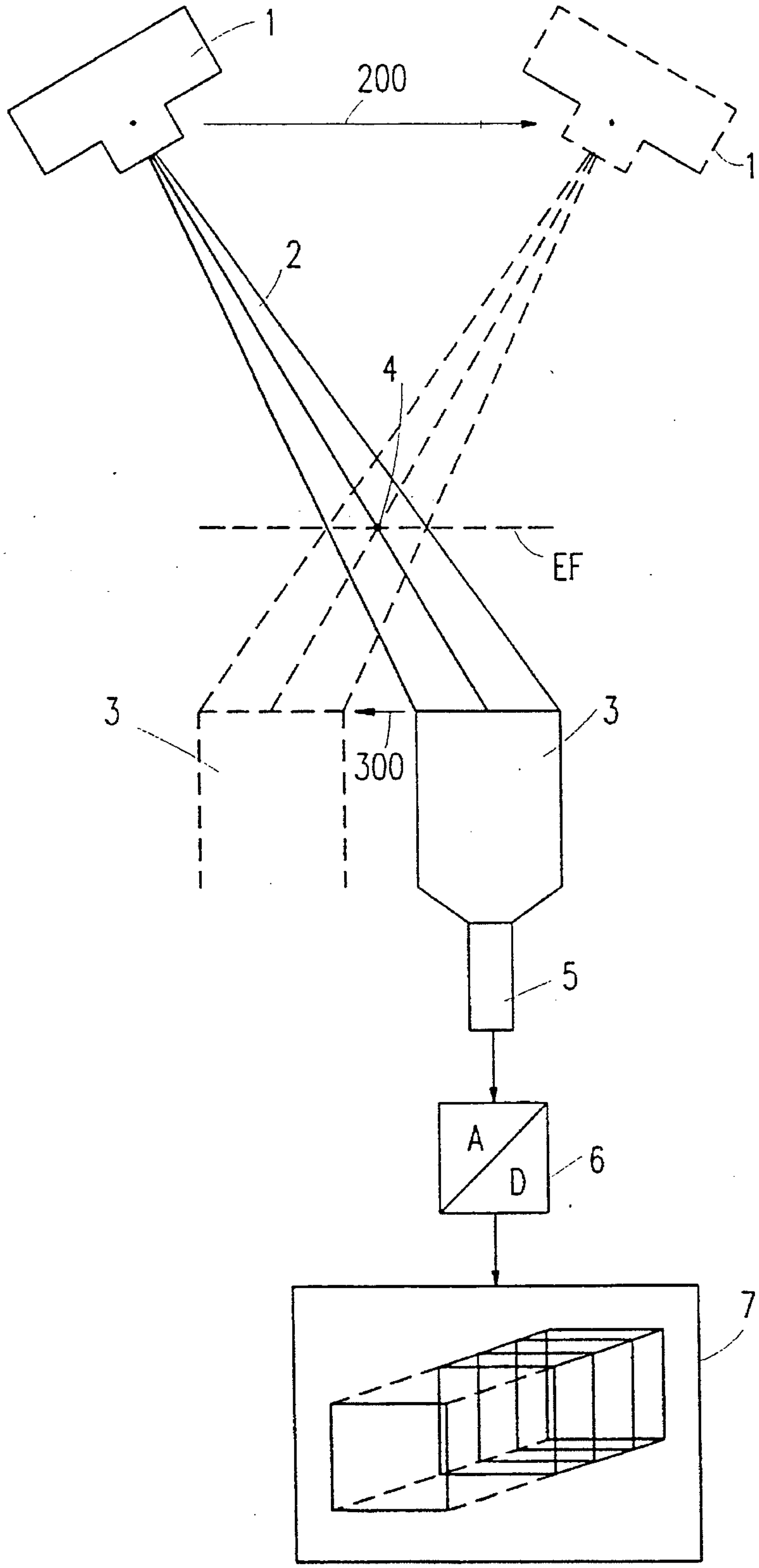
FIG. 1 shows parts of a layer imaging apparatus whereby the invention can be carried out.

The layer imaging apparatus which is shown purely diagrammatically in FIG. 1 comprises a radiation source 1 which projects an X-ray beam 2 onto the entrance screen of an X-ray image intensifier 3. As denoted by the two arrows 200 and 300, the X-ray source 1 and the X-ray image intensifier 3 can be displaced along parallel paths and in opposite directions from a first extreme position, represented by solid lines, to a 30 second extreme position which is denoted by dashed lines. In each of the two radiation source positions as well as in a preferably odd number of intermediate radiation source (and image intensifier) positions, X-rays are briefly switched on so that a single image is generated. The displacement to the various radiation source positions is realised so that the central rays of the radiation beams 2 intersect in one and the same point 4 in all positions. This can be ensured by coupling the X-ray source I and the image intensifier 3 to one another by means of a rod which can be pivoted about a horizontal axis which extends through the point 4 and perpendicularly to the plane of drawing. The plane EF containing the point 4 and extending parallel to the movement directions is referred to as the fulcrum plane.

A video camera 5 converts the exit image of the X-ray image intensifier 3 into an electric signal which is digitized by an analog-to-digital converter 6 and which is stored in a memory 7 whose capacity suffices to store the digitized video signal of all single images. Each single image may comprise, for example 256×256 or 512×512 image points. The number of single images must be large enough; for a pivot angle of from −20° to +20° (relative to the perpendicular), it has been found that a number of single images from 30 to 50 suffices. Thus, for each image point of each single image the memory 7 stores, in digital form, an image value which corresponds to the absorption of the X-rays in the examination zone surrounding the point 4.

Figure 2:
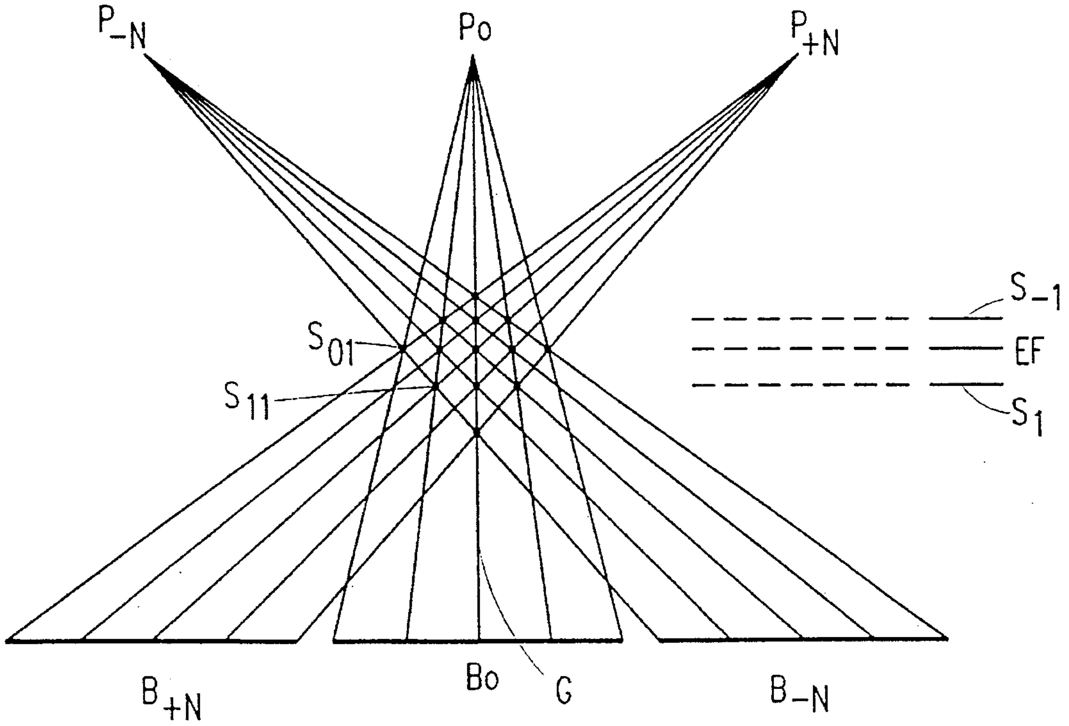
FIG. 2 shows the geometrical relationships during layer imaging.

FIG. 2 shows the geometrical relationships, modified with respect to FIG. 1 for the purpose of clarity, upon the formation of the single images. Three radiation source positions are shown, the radiation source position $P_0$ being situated at the centre of the range of movement whereas the radiation source positions $P_{-N}$ and $P_{+N}$ are situated at the ends of this range. The single images $B_0$, $B_{-N}$ and $B_{+N}$ are generated in these three positions. For the sake of simplicity it is assumed that each single image contains only five image points which are connected (at their centre) to the associated radiation source position by straight lines.

In order to generate a layer image which sharply reproduces a given slice, for each slice image point the image values of the image points which are geometrically associated with this relevant slice image point must be superposed. Thus, for a slice image of the fulcrum plane EF, for example the slice image value for the slice image point $S_{01}$ must be determined from the image-slice value of the image point situated at the extreme left in each of the single images. The other image-slice values for the fulcrum plane can be determined in an analogous manner. Generally speaking, it holds for the plane of this image-slice that with a point of the image-slice having the coordinates x and y and an image-slice value $S_0(x,y)$ there are associated the image values $B_n(x,y)$ from the single images of the image points having the coordinates x, y. The value n then ranges from −N to +N.

For the other layers a different combination of image values from the other image values must be used. For example, for the left-hand slice image point $S_{11}$ of the layer $S_1$ situated below the fulcrum plane and in which the straight lines extending from the radiation source positions to the image points of the single images also intersect, of the image value of the left-hand image point in the single image $B_{-N}$, the image value of the second image point from the left in the single image $B_0$, and the image value of the central image point in the single image $B_{+N}$ must be used. Generally speaking, it holds for this layer that for an image point having the coordinates x, y the slice image value $S_1(x,y)$ is composed of the image values $B_n(x+n,y)$. The coordinates x, y are counted from the straight line G connecting the central radiation source position $P_0$ to the centre of the single image $B_o$ generated in this position. It is also assumed that the x direction coincides with the direction of movement of the radiation sources and that y represents the horizontal direction extending perpendicularly thereto (perpendicularly to the plane of drawing of the FIGS. 1 and 2).

Analogously, for the layer $S_{-1}$ (being the first layer above the fulcrum plane EF) it is found that its slice image values $S_{-1}(x,y)$ can be derived from the image points $B_n(x-n,y)$. Generally speaking, for the image points in a layer $S_i$ (where i is a positive or negative integer which characterizes the position of this layer as viewed from the layer in the fulcrum plane) it holds that the slice image values $S_i(x,y)$ can be derived from the image values $B_n(x-i.n,y)$.

Figure 3:
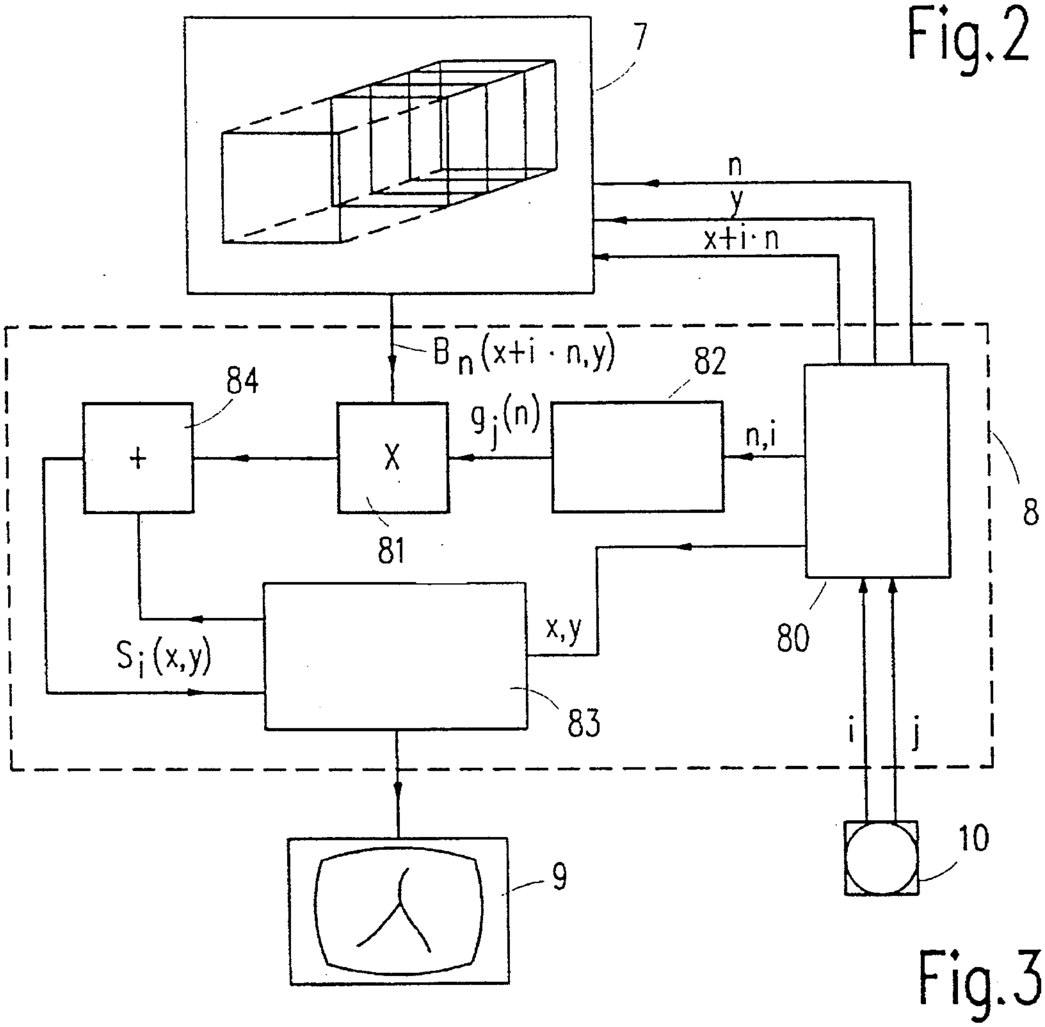
FIG. 3 shows a block diagram of a unit for performing the method.

FIG. 3 is a diagrammatic block diagram for generating images of a layer $S_i$ from the stored single images. The images $B_n$ stored therein are preferably stored in standardized form so that for a homogeneous object of uniform thickness in the examination zone all single images are identical. From the single images stored in the image memory 7 a layer image $S_i$ is generated by an image processing unit 8 so as to be displayed on a suitable display unit 9, for example a video monitor. Using a suitable control unit 10, the operator can preset on the one hand the position i of the layer $S_i$ and on the other hand to what extent contrast reversal and resolution effects are to be eliminated.

The image processing unit 8 comprises an arithmetic and control unit 80 which, in order to calculate slice image values of slice image points having the coordinates x, y in a layer i, determines the address at which the image value $B_n(x+i.n,y)$ is stored in the memory 7. This image value is fetched from the memory 7 so as to be applied to a multiplier stage 81. In this multiplier stage the image value is multiplied by a weighting factor $g_i(n)$. This weighting factor is the same for all image points of the single image $B_n$. The weighting factor is derived from a memory 82.

The image processing unit 8 also comprises a layer image memory 83 in which the layer image values $S_i(x,y)$ are stored after completion of the reconstruction of a layer image. The arithmetic and control unit 80 forms the address x, y of these slice image values and fetches the value stored at this address. At the beginning of reconstruction this value is zero. It is added, by way of an adder unit 84, to the value calculated by the multiplier stage 81, and the sum thus formed is stored in the memory 83 at the previously called address. Subsequently, the arithmetic and control unit 80 calculates the addresses in the memories 7 and 83 for another value of x, until all x values of a layer image line have been processed. This is repeated for another value of y, until all contributions of a single image $B_n$ to the layer image have been determined in this manner. Subsequently, the described procedure is repeated for all single images, after which the slice image values $S_i(x,y)$ are available in the memory 83. The layer image thus calculated is displayed on a monitor.

In conformity with the block diagram shown in FIG. 3, the multiplication and the addition are performed by the hardware units 81 and 84. However, to those skilled in the art it will be evident that the image processing unit may comprise a microcomputer which performs the address calculations, multiplications and additions by way of software.

Figure 5A:
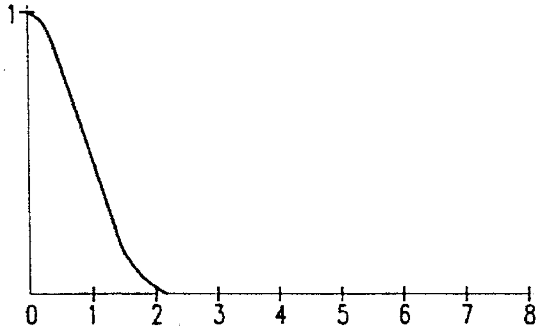
FIGS. 5*a* to 5*e* show the modulation transfer functions involved in the various sets of weighting factors.

If all weighting factors $g_j(n)$ were to have the value 1, the described image processing method would produce to the same images as obtained by the method described where the image values, geometrically associated with a slice image point, of the single images are added. For objects situated in the examination zone at a defined distance from the sharply imaged layer $S_i$, a modulation transfer function is then obtained as shown in FIG. 5e. It appears that local frequencies below the value 1 are transferred better as the local frequency is nearer to zero. In the range between the local frequencies 1 and 2, the curve of FIG. 5e has negative values, i.e. the contrast is reversed (areas of high absorption are thus imaged as if only low absorption occurs therein and vice versa). In the range of local frequencies between 2 and 3 normal contrast occurs again, even though it is not as high as in the range between 0 and 1. Because the contrast is already zero for the local frequency 1, this variation of the modulation transfer function in the local frequency range between two and three leads to pseudo-resolution. In the local frequency range beyond three, the modulation transfer function exhibits further negative and positive swings whose amplitude, however, becomes increasingly smaller.

FIG. 5e in principle holds for all layers outside the layer sharply reproduced by the reconstruction. The limit of the real resolution is shifted more towards low values of the local frequency as the distance between the relevant structures and the sharply reproduced layer in the examination zone is larger. When this is taken into account by varying the unit of the local frequency accordingly, FIG. 5e holds for all these layers.

When the layers which are not sharply reproduced contain a substantial amount of structures which are in the local frequency range of between 1 and 2 or 2 and 3 or a range beyond that, contrast reversal or pseudo-resolution effects will occur in the layer image, which effects are liable to impede the diagnostic evaluation of the layer image. In order to suppress these effects, the weighting factors for the various images must be dependent on the radiation source position during formation of the relevant single image in such a manner that the weighting factor is smaller as the distance between the radiation source position and the central radiation source position ($P_o$) is larger.

Several dependencies are feasible. A particularly attractive compromise between the suppression of said effects on the one hand and the blurting of details outside the layer on the other hand, however, is obtained when the following equation is satisfied:

$$g_j(n)=1+a_{j1}.b_1+a_{j2}.b_2 \qquad (1)$$

The index j indicates that there are several sets of weighting factors (with own factors $a_{j1}$ and $a_{j2}$), each time one of which can be selected for a layer image. For the factors $b_k$ (where k is 1 and 2) it holds that:

$$b_k=\sqrt{2}.\cos(\Pi.k.n/N) \qquad (2)$$

Therein, N denotes the number of radiation source position to the left or to the right of the centre and n indicates in which radiation source position (taken from the centre) the radiation source was situated upon generation of the single image $B_n$. Furthermore:

$$a_{j1}=0.693;\ a_{j2}=0.0267\ (j=1) \qquad (3)$$

Figure 4:
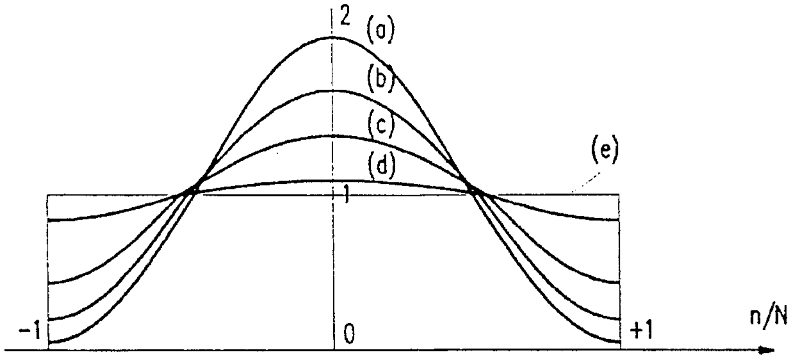
FIG. 4 shows the dependency of the weighting factors on the radiation source position for different sets of weighting factors.

When the weighting factors $g_j(n)$ thus calculated are applied as a function of the value n/N and when these factors are interconnected by way of an envelope, the curve (a) shown in FIG. 4 is obtained. FIG. 5a shows the modulation transfer function for a plane which is situated outside the plane of the sharply imaged layer when the layer image is formed by means of this set of weighting factors. It appears on the one hand that no contrast reversal and no pseudo-resolution occur, because the contrast monotonously decreases as a function of the local frequency. However, it also appears that only structures beyond a local frequency of 2 no longer produce a contrast in the sharply imaged layer, i.e. the blurting effect is only half of that according to the modulation transfer function of FIG. 5e in which the contrast disappears already at the local frequency 1.

Therefore, it makes sense to weight the single images with the set of weighting factors in conformity with the equations (1) to (3) only if comparatively strong contrast reversal or pseudo-resolution effects occur in a layer image. If these effects are less pronounced, it may be useful to use a set of weighting factors which is less dependent on n than the set of weighting factors represented by the envelope (a) in FIG. 4. Such a set of weighting factors can be calculated by means of the equations (1) and (2) when $a_{j1}$ and $a_{j2}$ are selected as:

$$a_{j1}=0.5358;\ a_{j2}=-0.0316\ (j=2) \qquad (4)$$

Figure 5B:
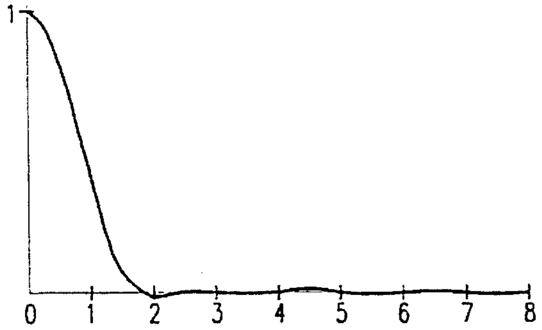

The curve (b) in FIG. 4a shows the associated envelope and FIG. 5b shows the resultant modulation transfer function. It appears that the blurring effect is better than that of FIG. 5a, but aim that small phase reversal or pseudo-resolution effects can occur in given circumstances.

Using the equations (1) and (2) a further set of weighting factors is obtained when the following values are selected for $a_{j1}$ and $a_{j2}$ $$a_{j1}=0.3248;\ a_{j2}=-0.0494\ (j=3) \qquad (5)$$

Figure 5C:
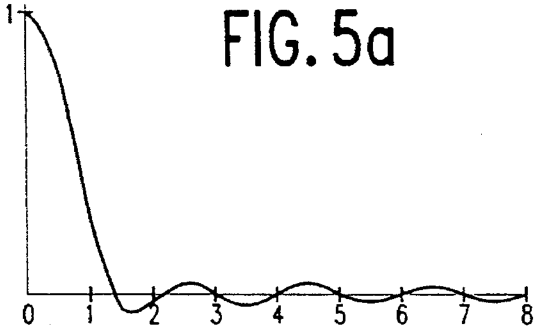

The curve (c) in FIG. 4 represents the associated envelope and FIG. 5c shows the modulation transfer function. The blurring effect is stronger than, for example in FIG. 5b, but phase reversal and pseudo-resolution effects may also be stronger, be it not so strong as in FIG. 5e which shows an even stronger blurring effect.

Figure 5D:
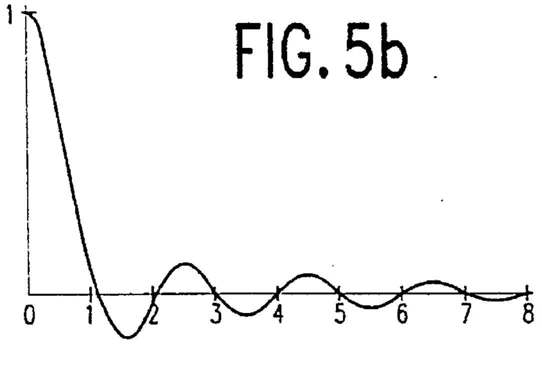
Figure 5E:
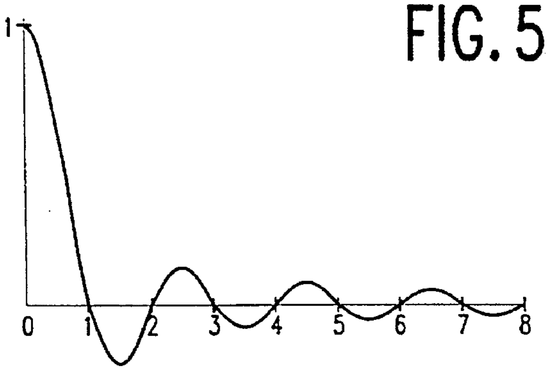

FIG. 5d shows a modulation transfer function where the disturbing and desired effects are more pronounced than in FIG. 5c, but not as strong as in FIG. 5e. The associated envelope is represented by the curve (d) in FIG. 4 and the associated weighting factors can be calculated from the equations (1), (2) by means of the values $$a_{j1}=0.0814;\ a_{j2}=-0.0182\ (j=4) \qquad (6)$$

During a tomographic examination, first 2N+1 single images are formed and subsequently the operator enters via the input unit c, the parameter i which indicates the layer to be sharply reproduced by the layer image to be formed. By entering j, the adjusting unit 10 can first provide a given set of weighting factors $g_j(n)$, for example the set according to the curve (a) in FIG. 4 or according to the equations (1) to (3). This set of weighting factors, like the other feasible sets of weighting factors, is stored in the memory 82 and the arithmetic and control unit fetches each time the weighting factor $g_j(n)$ associated with the relevant single image $B_n$.

After the formation of a layer image in this manner, the operator can initiate a stronger blurring effect by selecting another set of weighting factors, for example the set shown in FIG. 4(*b*) with the modulation transfer function according to FIG. 5b (j=2). If disturbing effects still do not occur, blurring can be further increased by selection of a further set of weighting factors, until a sensible compromise is reached between blurring on the one hand and disturbing effects on the other hand. In some cases it may be useful to provide a further set of weighting factors which is not illustrated in the FIGS. 4 and 5 and in which the weighting factors increase as the quotient n/N increases. However, such a set will be used only when the disturbing effects remain absent from the layer image even when all weighting factors are equal; blurring is then even more pronounced than in FIG. 5*e*. The procedure is similar for the formation of slice images of other layers of the examination zone.

In the device shown in the FIGS. 1 and 2, the X-ray source 1 and the image pick-up device .3 move along straight lines in opposite directions. The invention, however, can also be used for devices in which the X-ray source and the image pick-up device move in opposite directions in orbits about a horizontal axis in the fulcrum plane. A combination (orbitting of the source and rectilinear path of the image pick-up device) is also possible. However, the enlargement factor then changes, so that the images must be subjected to a geometrical transformation before addition.

The radiation source positions in the embodiment described above were symmetrically situated relative to the point 4 (FIG. 1 ) in the fulcrum plane, their distance from one another was the same and their number was odd. These conditions are useful, but can be dispensed with individually or all together. The "central radiation source position" in the context of the invention is then the geometrical centre between the two extreme outer positions; this position need not be identical to one of the radiation source positions for the single images. In order to calculate the set of weighting factors in accordance with the equation (1), in the equation (2) the expression n/N must then be replaced by $x/x_0$, x being the distance between the relevant radiation source position and the centre and $x_0$ the centre-to-centre distance between the two extreme outer radiation source positions.

I claim:

1. A method of generating slice images of an examination zone which is irradiated by X-rays from a plurality of radiation source positions in order to generate separate single images each associated with a different one of the plurality of radiation source positions, which method comprises: for each single image storing image values which correspond to X-ray absorption at image points of the single image, generating slice images by deriving slice image values from the stored image values of the image points of the single images which are geometrically associated with a slice image point, said the slice image values being derived by a weighted summing operation where a weighting factor applied to the image values of each single image prior to a summing operation decreases as the distance between the radiation source position associated with the single image and a central radiation source position increases.

2. A device for generating layer images of an examination zone, comprising at least one X-ray source for irradiating the examination zone from a plurality of radiation source positions which are situated in one plane, an image converter for converting projection images picked up in response to the irradiation from the respective radiation source positions into image values, and an image storage device for storing the image values of the projection images, an image processing unit for generating layer images from the image values of the projection images, characterized in that the image processing unit comprises an arithmetic unit which, in order to generate layer images, multiplies the image values of each projection image by a weighting factor which is dependent on the radiation source position in response to which the projection image was picked up and which sums the image values, thus weighted, of the image points of the projection images geometrically associated with a layer image point.

3. A device as claimed in claim 2, characterized in that the image processing unit comprises a memory in which several, different sets of weighting factors are stored, there being provided selection means for selection of a set of weighting factors.

* * * * *